W. T. BONNER.
FRICTION MEMBER.
APPLICATION FILED JAN. 20, 1909.
931,988.
Patented Aug. 24, 1909.
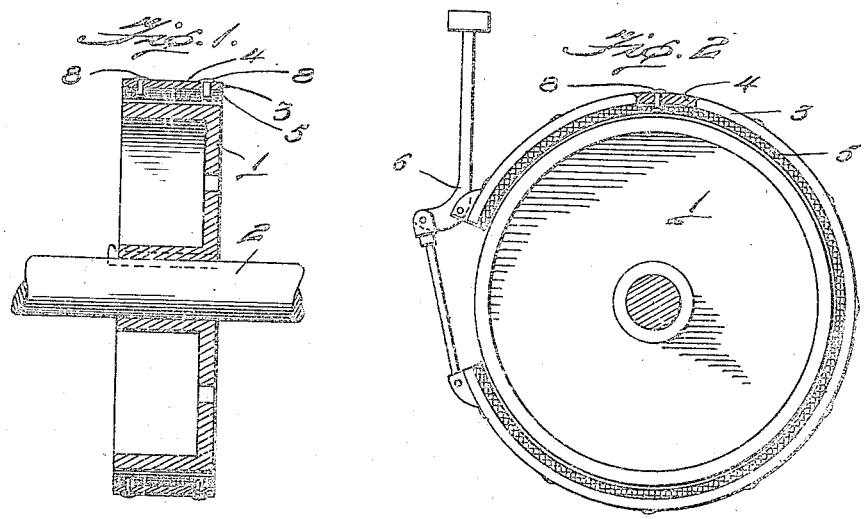
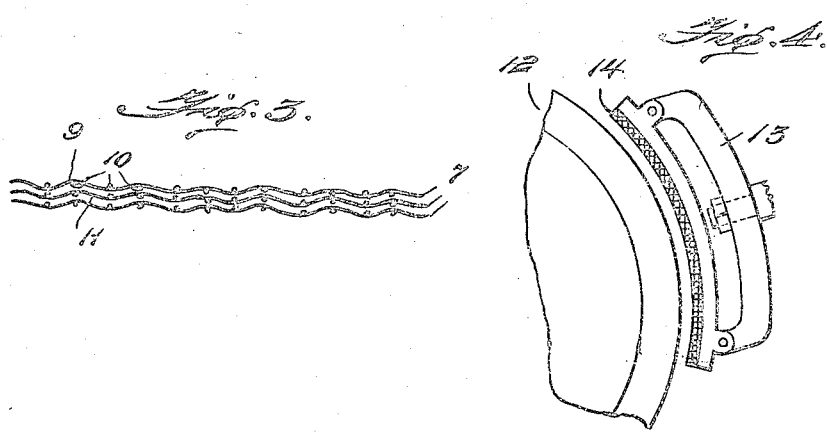
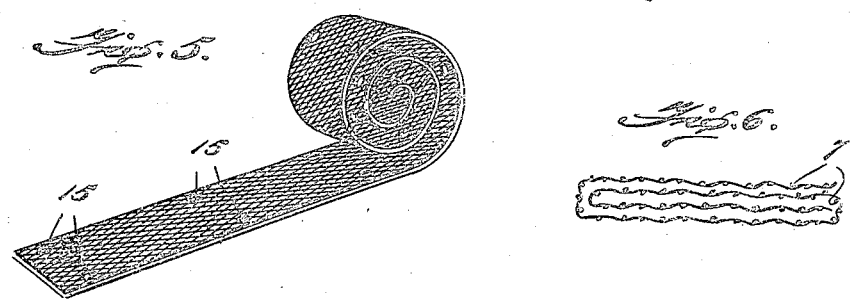
Inventor
William T. Bonner
By K. P. McElroy
Attorney
Witnesses

UNITED STATES PATENT OFFICE.

WILLIAM T. BONNER, OF WASHINGTON, NORTH CAROLINA.

FRICTION MEMBER.

931,988.　　　　　　　Specification of Letters Patent.　　Patented Aug. 24, 1909.

Application filed January 20, 1909. Serial No. 473,317.

*To all whom it may concern:*

Be it known that I, WILLIAM T. BONNER, a citizen of the United States, residing at Washington, in the county of Beaufort and State of North Carolina, have invented certain new and useful Improvements in Friction Members, of which the following is a specification.

This invention relates to friction members; and it comprises a brake having a friction element or liner of assembled plies or layers of wire fabric and a holding element adapted to maintain said friction element in frictional contact with a surface to be braked; all as more fully hereinafter set forth and as claimed.

In high duty brakes of all kinds, and particularly those in which the engaging surfaces are relatively small as compared with the energy to be absorbed, as in hub and axle brakes of automobiles, the stresses and strains in the engaging members are very great, necessitating the use of material of good stiffness and tensile strength. These qualities are, however, difficult to find combined in substances having also a good coefficient of frictional resistance. Asbestos, leather and other materials having a good frictional coefficient are generally lacking in the stiffness or the strength desirable for the present purposes. Metal, such as steel, brass or bronze, has the desired strength, though many of the "friction metals" are hardly so strong, but in high duty work metal tends to wear to a smooth surface, and in high-duty braking, such as is necessary with automobiles, after a time a metal brake is apt to wear so smooth that there is no intermediate stage between no-engagement and a locking-engagement. It is, of course, desirable in all braking work that there shall be the possibilty of intermediate engagements whereby a vehicle or other moving object may be brought to rest more or less gradually. In a metal strap engaging an automobile axle sleeve, for instance, no matter how efficiently the brake works at first, after a time the strap and sleeve wear smooth, so that in an emergency stop a locking pressure must be exerted endangering tires and wheels. The same is true of brake sleeves engaging car wheels, and is a prolific cause of "flat wheels." With other materials than metal in the brake, such as the various frictional non-metallic substances ordinarily used, the friction material is apt to tear or wear out after a time, the strength and stiffness of such substances being ordinarily low.

In the present invention, I have devised a different type of brake, assembling various elements in such manner that the friction-surface will always present a cross-grain friction to the engaging surface, whatever the use or wear, while the friction material will preserve a resilience enabling the application of various degrees of engagement between no-engagement and locking-engagement. For this purpose, I assemble together a plurality of plies or layers of wire fabric in such manner as to give a mutual support with a holding element adapted to maintain such assemblage of plies or layers in a strong and secure manner and to give the exterior or friction layer any desired engagement with a surface to be braked. I may use the ordinary wire gauze, that is, a fabric in which the wires cross each other at right angles, but I prefer the fabric very closely woven. Or I may use the knitted wire fabric in which the wires are looped about each other to a greater or less extent. With the knitted fabric under pressure the plies give a very good mutual locking engagement and exhibit a desirable friction surface for the present purposes.

A laminated liner built up of knitted plies is very strong. In such a laminated liner built up from a knit fabric, the wires forming a given loop on the exterior surface go downward into the fabric and are secured on the other side by other loops, giving great strength, even after long wear, while the surface loops, being interrupted by spaces, give what is in effect a cross-grain surface. Furthermore, the loops on the under side of what is the exterior layer, under great pressure are forced down into the corresponding spaces of the layer next below, so that in effect the two layers together give substantially uninterrupted metal. The ordinary woven fabrics however give the same effect and produce the same locking engagement under pressure, though not quite so efficiently as the knit fabric. In practice, I prefer more than two layers, using from two up to as many as the size of brake requires.

The metal of the fabric may be any that is desired, and all the layers need not be the same. Steel, brass, bronze and aluminum bronze are all suitable, but I ordinarily prefer steel. Any of the commercial steels and alloy steels may be used.

In assembling the several plies to form the desired brake liner, a sheet of fabric may be simply folded into the desired shape, or the several plies may be cut to shape and laid together. The assemblage is next submitted to heavy pressure, as by a hydraulic press, whereby the several plies are given the stated mutual locking engagement, and become, for the present purposes, substantially an integral whole. While still under pressure, the plies may be bolted together, retaining the compression, and the bolts afterward replaced by rivets, or the assemblage may be directly riveted while still under pressure. Or the mass of plies may be heated and welded under the hammer; or locally united by electric spot welds. A welded mass of wire fabric plies presents a number of advantages for the present purposes since it is very strong, cannot wear to any but a cross-grained surface while being substantially an integral mass and cannot break up under wear. The riveted assemblage on the other hand, whatever the pressure of assemblage, is more or less resilient under pressure and gives the possibility of a very desirable series of varying engagements between no-engagement and locking engagement.

The shape of the mass of wire-fabric is, of course, made to conform to that of the surface to be braked and that of the holding element. In a strap brake for automobiles and like purposes, it may be that of a long strip of metal. Where this strap is to be curved, the mass may be correspondingly curved, or it may be cut through, partially or wholly, from the obverse side, to permit a concave curvature. In such a strap brake, for example, the strip of wire gauze may be cut into blocks, proximally assembled in a more or less flexible holder, thereby giving a flexible braking element. The friction mass may be assembled with the holding element in any convenient manner, as by the use of lugs on said holding element engaging the friction member and holding it in place, or by the use of bolts or rivets. For many purposes, a convenient method of assemblage is to place holding element and wire-fabric plies together under pressure and rivet or bolt the whole body together while such pressure is maintained. Bolts may be employed while the assemblage is under pressure and these afterward replaced *seriatim* with rivets.

The mass of wire-fabric plies may be impregnated with rubber or other plastics; the rubber being applied, for instance, as a comparatively thin composition impregnating the whole mass, and the mass being afterward vulcanized as a whole. This results in the formation of an integral mass of rubber within and including the wire-fabric body, filaments of rubber passing through the meshes. Or each layer of wire-fabric may be impregnated before the next is put in place; the whole mass compressed, and afterward vulcanized. Where the plies are riveted or bolted together, the use of rubber is mainly convenient for giving the frictional surface a smooth contour without interfering with the friction. In brakes for exceptionally high duty where such heat is likely to develop, the rubber may be disadvantageous as apt to char and as interfering to some extent with the communication of heat from the braking surface through to the holding element. In an all-metal braking element under the present invention, the several plies or layers are all in good thermal contact, both with each other and with the holding element, which is a desirable feature as tending to dissipate the heat evolved on the friction surface in operation. In such an all-metal brake, the wire-fabric layer under the one which forms the braking surface, and which is advantageously steel, may be of copper or other good heat-conductive metal in order to assist in this dissipation of heat.

Either the braking element proper, or the element to be braked may be made of wire-fabric layers under the present invention; but it is generally preferable to use the wire fabric layers for the former.

In the accompanying illustration, I have shown, more or less diagrammatically, sundry of the many possible embodiments of the described invention.

In this showing:—Figure 1 represents a vertical longitudinal section of an automobile brake and brake spool; Fig. 2 represents an end elevation of the same; Fig. 3 is a section (on a greatly enlarged scale) of several plies of wire fabric, showing the interlocking resulting under pressure; Fig. 4 is a view showing a brake shoe having a wire-fabric liner; Fig. 5 is a perspective view of a complete liner for the holding element of Figs. 1 and 2; and Fig. 6 is a section of a liner formed from folded wire cloth.

In this showing (see Figs. 1 and 2), 1 is an element to be braked, as shown, a spool or hub upon an axle, 2, which may be an automobile axle. This hub may be of ordinary turned, forged or cast metal. Around it is strap brake 3, composed of a metal holding element 4, carrying friction liner 5, and brought into and out of engagement by lever 6 in an ordinary manner. The liner is composed of a plurality of layers of wire fabric 7, and may be formed, as shown in Fig. 6, of a sheet of wire-fabric folded to form a flat roll. The several plies of this roll are maintained in mutual locking contact (see Fig. 3) by being assembled under heavy pressure, such pressure being preserved in the complete article by rivets or bolts 8. These fastening elements may, as shown, also engage the metal holding element. The liner may or may not be, as may be desired, impregnated with rubber or other plastic.

In Fig. 3, which shows an enlarged section of several plies of fabric, the upper side may be considered the friction surface. On this side, as will be perceived, project a number of loops, 9, each inclosing the meshing wire 10. Below are corresponding loops and these latter in compressing the plies together, sink more or less into the spaces between the loops 11 of the sheet next below, and are given lateral support thereby against the frictional stresses of use. The tops of the first set of loops together form the frictional surface of the brake. The loops of the second ply, as will be perceived, mesh partly with the spaces of the layer above and partly in the spaces of the layer below, and so on. As will be perceived, the layers or plies of wire-fabric thus assembled form a composite body in which the several portions are so located relatively to each other as to give a maximum of strength. With a knitted fabric in which the loops and spaces are more developed than in a woven fabric this intermeshing effect is somewhat enhanced, but the woven fabric forms a structure amply strong for most purposes.

For the sake of clearness of illustration, in all figures the wire fabric is shown rather open in mesh, but in practice it is employed as closely woven as may be.

In Fig. 4, an ordinary car wheel 12 is shown, braked by brake shoe 13, containing plies of wire-fabric 14.

In Fig. 5, a complete liner is shown, ready for assemblage with the holding element of Figs. 1, 2, or 4. If it be desired to bolt it in place, bolts may be placed in orifices 15 to maintain the layers under the compression of the forming press, and may be removed one by one and replaced by the bolts attaching it to the holding element. Or it may be retained in place by any suitable shape of the holding element.

Fig. 6 shows on an exaggerated scale, a piece of wire cloth folded over itself to produce a narrow strip of laminated friction fabric. After the folding, the strip is placed under compression and the compression retained by bolts passing through orifices similar to those indicated by 15 in Fig. 5.

In all friction elements under the present invention, it is desirable that there should be a sufficient number of the fabric plies to form a body of substantial thickness and give support and resilience in the described manner to the layer or ply which forms the friction surface proper, it being difficult to support otherwise such ply in a manner which will enable it to resist the stresses and strains of high-duty braking. Such a laminated body however, is substantially as strong as one of solid metal when formed in the described manner, and is as easily supported in a holding element. And over solid metal or other friction elements, in addition to its very desirable friction surface it has the advantage of resiliency, enabling, as stated, varying engagements with the member to be braked.

While folding a sheet of wire fabric into the form of a strip is a convenient method of assemblage, yet the several plies may be directly cut into shape prior to assemblage.

What I claim is:—

1. A brake comprising a holding member and a plurality of contacting layers of wire fabric secured thereto, the face of the outermost layer forming a friction surface.

2. A brake comprising a holding member and a plurality of contacting compressed layers of wire fabric secured thereto, the face of the outermost layer forming a friction surface.

3. In a friction device, a body comprising a plurality of contacting compressed layers of wire fabric and headed fastening elements passing transversely through such body, an outer layer of such plurality of layers being adapted to form a friction surface.

4. In a friction device, a friction element composed of a plurality of contacting folds of wire fabric assembled and maintained under compression, an outer fold of such plurality of folds being adapted to form a friction surface.

5. In a friction device, a friction element composed of a plurality of turns of wire fabric folded about each other and assembled and maintained under compression, an outer turn of such plurality of turns being exposed and adapted to form a friction surface.

6. A brake comprising a holding element, a liner therefor comprising a plurality of folded plies of wire fabric and fastening elements securing said liner to said holding element and maintaining said plies under compression, an outer ply of such plurality of plies being exposed and adapted to form a friction surface.

In testimony whereof, I affix my signature in the presence of witnesses.

WILLIAM T. BONNER.

Witnesses:
WM. A. FURMAN,
J. W. MURPHY.